US009793812B2

(12) United States Patent
Friebe et al.

(10) Patent No.: US 9,793,812 B2
(45) Date of Patent: Oct. 17, 2017

(54) METHOD FOR OPERATING AN INVERTER WITH REACTIVE POWER CAPABILITY HAVING A POLARITY REVERSER, AND INVERTER WITH REACTIVE POWER CAPABILITY HAVING A POLARITY REVERSER

(71) Applicant: SMA Solar Technology AG, Niestetal (DE)

(72) Inventors: Jens Friebe, Vellmar (DE); Oliver Prior, Marsberg (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 15/238,067

(22) Filed: Aug. 16, 2016

(65) Prior Publication Data

US 2016/0359415 A1     Dec. 8, 2016

Related U.S. Application Data

(63) Continuation of application No. PCT/EP2014/068771, filed on Sep. 3, 2014.

(30) Foreign Application Priority Data

Feb. 18, 2014   (DE) .................. 10 2014 102 000

(51) Int. Cl.
*H02M 3/22*   (2006.01)
*H02M 3/24*   (2006.01)
(Continued)

(52) U.S. Cl.
CPC .............. *H02M 3/24* (2013.01); *H02J 3/383* (2013.01); *H02M 1/42* (2013.01); *H02M 1/44* (2013.01);
(Continued)

(58) Field of Classification Search
CPC ............ H02M 3/22; H02M 3/24; H02M 5/45; H02M 5/4505; H02M 5/452; H02M 5/458; H02M 5/4585; H02M 3/10; H02M 3/3155
(Continued)

(56) References Cited

U.S. PATENT DOCUMENTS 8,027,179 B2    9/2011  Hallak
2011/0188272 A1* 8/2011  Smedley ................. G21D 7/00
                                                   363/37

(Continued)

FOREIGN PATENT DOCUMENTS

WO    2012146414 A2    11/2012
WO    2012150933 A1    11/2012

OTHER PUBLICATIONS

Xie Shaojun, et al., Research on a Novel Inverter Based on DC/DC Converter Topology, The 29th Annual Conference of the IEEE Industrial Electronics Society, 2003. IECON '03, IEEE Service Center, Piscataway, NJ. vol. 1, Nov. 2, 2003 (Nov. 2, 2003), pp. 647-651, XP010693589, ISBN: 97/-0-7803-7906-0 paragraph [00IV]; figures 2, 3, 8.

(Continued)

*Primary Examiner* — Adolf Berhane
*Assistant Examiner* — Afework Demisse
(74) *Attorney, Agent, or Firm* — Eschweiler & Potashnik, LLC

(57) ABSTRACT

A method for operating an inverter with reactive power capability that includes a voltage link circuit and an unfolding bridge, wherein poles of the voltage link circuit are configured to be selectively connected to terminals of an AC output in different configurations by means of the unfolding bridge, in order to change a polarity of the AC output relative to the voltage link circuit. The method includes in the case (Continued)

of a phase shift between an AC current (I) and an AC voltage (U) at the AC output reversing the direction of a current flowing via the voltage link circuit. Reversing the direction of the current flowing via the voltage link circuit includes disconnecting the AC output from the voltage link circuit, providing a freewheeling path between the terminals of the AC output, while the AC output is disconnected from the voltage link circuit, and reconnecting the AC output to the voltage link circuit with the polarity of the AC output relative to the voltage link circuit being changed by the unfolding bridge.

23 Claims, 5 Drawing Sheets

(51) Int. Cl.
| | |
|---|---|
| H02M 7/5387 | (2007.01) |
| H02M 1/44 | (2007.01) |
| H02J 3/38 | (2006.01) |
| H02M 7/48 | (2007.01) |
| H02M 1/42 | (2007.01) |
| H02M 1/00 | (2006.01) |
| H02M 3/158 | (2006.01) |

(52) U.S. Cl.
CPC ......... *H02M 7/48* (2013.01); *H02M 7/53871* (2013.01); *H02M 3/1582* (2013.01); *H02M 2001/007* (2013.01); *Y02E 10/563* (2013.01)

(58) Field of Classification Search
USPC .......................................................... 363/15
See application file for complete search history.

(56) References Cited

U.S. PATENT DOCUMENTS

2012/0014151 A1\* 1/2012 Alexander ............ H02M 5/225
                                                                363/123
2012/0155141 A1    6/2012 Esaka et al.

OTHER PUBLICATIONS

International Search Report Dated Dec. 15, 2014 (PCT/EP/2014/068771).

\* cited by examiner

METHOD FOR OPERATING AN INVERTER WITH REACTIVE POWER CAPABILITY HAVING A POLARITY REVERSER, AND INVERTER WITH REACTIVE POWER CAPABILITY HAVING A POLARITY REVERSER

CROSS REFERENCE TO RELATED APPLICATIONS

This application claims priority to International Patent Application number PCT/EP2014/068771, filed on Sep. 3, 2014, which claims priority to German Patent Application number 10 2014 102 000.6, filed on Feb. 18, 2014, and is hereby incorporated by reference in its entirety.

FIELD

The disclosure relates to methods for operating an inverter with reactive power capability comprising a voltage link circuit and an unfolding bridge and to an inverter with reactive power capability comprising a bidirectional DC/DC converter, a voltage link circuit and an unfolding bridge which have the features of the preambles of the independent patent claims.

BACKGROUND

In order to construct an inverter comprising few switches with high-frequency clocking which is nevertheless able to shape a sinusoidal AC current, it is known to combine a DC/DC converter with an unfolding bridge. In this combination, the DC/DC converter shapes half-cycles of the AC current, and the unfolding bridge connects two AC current terminals of the inverter with alternating polarity to the outputs of the DC/DC converter or the poles of an interposed voltage link circuit. The reversal of the polarity is performed upon each zero crossing of an AC voltage applied to the AC current terminals externally. In general, this is the AC voltage of an AC grid into which electrical energy from a DC generator is fed by the inverter.

In order that such an inverter comprising a DC/DC converter and an unfolding bridge is provided with reactive power capability, various measures are known. These measures can be subdivided into two groups.

In the case of the measures in the first group, the current is output by the DC/DC converter only ever in the direction of the external AC voltage, but with a shift in the centroid of its current-time integral relative to the centroid of the voltage-time integral during each half-cycle of the AC voltage. This is described for example in DE 10 2010 035 020 A1. A unidirectional DC/DC converter is sufficient for realizing this measure. However, only small phase shift angles between the output AC current and external AC voltage can be realized expediently in this way. As the phase shift angle increases, the output AC current is increasingly deformed relative to the desired sinusoidal waveform and accordingly has a total harmonic distortion that increases with the phase shift angle. A high total harmonic distortion indicates that a signal has a pronounced harmonic component, which may result in electromagnetic interference.

In the case of the second group of measures, the DC/DC converter is implemented in bidirectional fashion, such that it may allow the current to flow in the opposite direction to the instantaneous voltage at the AC output as well. In this regard, DE 10 2009 029 387 A1 discloses an inverter, in particular a solar cell inverter of a photovoltaic installation, in which a semiconductor bridge circuit as polarity reverser is combined with a DC/DC converter in the form of a DC chopper controller designed as a four-quadrant controller. The DC chopper controller may comprise in particular a combination of a buck converter and a boost converter or a buck-boost converter with a common inductance.

During the operation of an inverter comprising a bidirectional DC/DC converter and an unfolding bridge for providing reactive power, i.e. in the case of a phase shift between AC current and AC voltage at the AC output of the inverter, however, the direction of the current flowing through the DC/DC converter has to be reversed when the unfolding bridge reverses the polarity between the half-cycles of the AC voltage. In the case of a reversal from a negative current, relative to the instantaneous voltage, to a positive current, this generally does not pose a problem because the DC input voltage of a DC source connected to the DC input acts as a driving force for this. The situation is different, however, in the case of a reversal from a positive current, in comparison with the instantaneous voltage at the AC output, to a negative current. This is accounted for by the only very low instantaneous voltage at the AC output at the zero crossing of the AC voltage. With this very low instantaneous voltage, a voltage-time integral required for reversing the direction of the current through an inductance of the DC/DC converter may be established only over a comparatively long time period. This time takes effect as a dip in the current and accordingly as a deviation from the desired sinusoidal profile of the AC output by the inverter. A high total harmonic distortion of the output AC current is the consequence.

This problem is not addressed in DE 10 2009 029 387 A1.

CN 103208935 A also discloses the combination of a bidirectional DC/DC converter with an unfolding bridge for providing reactive power.

In accordance with CH 700 030 B1, a bidirectional DC/DC converter combined with an unfolding bridge is subdivided into a buck converter and a boost converter, which have a symmetrical design with inductances between the two poles of an input terminal and a voltage link circuit, wherein these inductances are used both by the buck converter and by the boost converter. Here, too, there is no discussion of the high total harmonic distortion of the output AC current when providing reactive power.

WO 2013/134904 A1 describes an inverter comprising a buck-boost converter of symmetrical design and an unfolding bridge.

WO 2012/146414 A2 describes methods having the features of the preambles of independent patent claims 1 and 13 and an inverter having the features of the preamble of alternative independent patent claim 15. In this case, a bidirectional DC/DC converter in the form of a buck-boost converter is combined with an unfolding bridge to form an inverter with reactive power capability. In order to avoid difficulties in the case of changing the direction of the current flowing via the voltage link circuit in the case of a negative phase shift angle between AC current and AC voltage, i.e. in the case of an AC current lagging behind the AC voltage, a sudden change in the set point profile of the current through the inductor of the buck-boost converter is avoided. For this purpose, the set point profile of the current is modified such that it likewise has a zero crossing at zero crossing of the AC voltage. The resulting deviation of the output current from the desired sinusoidal profile results in a high total harmonic distortion here as well.

JP 2002 369388 A discloses the combination of a bidirectional boost converter with an inverter bridge in which, at least at the zero crossing of the voltage, at least two switches of the inverter bridge besides two switches of the boost converter are subjected to high-frequency clocking for the purpose of shaping the AC current. The inverter bridge is therefore not an unfolding bridge whose bridge switches are clocked substantially at a low frequency of the order of magnitude of the frequency of the output AC current.

WO 2011/042567 A1 discloses an inverter with reactive power capability which comprises two buck-boost converters, the inductors of which are respectively connected to one of the two terminals of an AC output. In this case, the two buck-boost converters are bridged alternately for a half-cycle of the output AC current. Reactive power with a phase shift angle of the output AC current deviating from zero is realized by blockwise outputting of pure active power and pure reactive power over in each case one period or a plurality of periods of the AC voltage.

SUMMARY

The problem addressed by the disclosure is that of providing methods for operating an inverter with reactive power capability comprising a voltage link circuit and an unfolding bridge and also a corresponding inverter in which the output AC current, even if it lags behind the AC voltage at the AC output with a large negative phase shift angle, has a low total harmonic distortion.

In the method according to the disclosure for operating an inverter with reactive power capability comprising a voltage link circuit and an unfolding bridge, wherein poles of the voltage link circuit are connectable to terminals of an AC output in different configurations, for example alternately, by means of the unfolding bridge, in order to change the polarity of the AC output relative to the voltage link circuit, in the case of a phase shift between AC current and AC voltage at the AC output, that is to say in order to provide reactive power, the direction of a current flowing via the voltage link circuit is reversed when the polarity of the AC output relative to the voltage link circuit is changed by the unfolding bridge between the half-cycles of the AC voltage. Reversing the direction of the current flowing via the voltage link circuit comprises disconnecting the AC output from the voltage link circuit, providing a freewheeling path between the two terminals of the AC output, while the AC output is disconnected from the voltage link circuit, and reconnecting the AC output to the voltage link circuit with the polarity of the AC output relative to the voltage link circuit being changed by the unfolding bridge.

The bidirectionality of the inverter with reactive power capability may be provided by at least one bidirectional (partial) converter or by at least two unidirectional partial converters connected in antiparallel, which shape the current flowing via the voltage link circuit. In principle, it is sufficient in this case for the bidirectionality to be provided in respect of the voltage link circuit, i.e. for the DC/DC converter to be able to allow the current to flow in both directions via the voltage link circuit. In this regard, for example, two unidirectional partial converters connected in antiparallel need not be connected to one another on their side remote from the voltage link circuit. Rather, at least one of the partial converters may be connected there exclusively to a buffer store for electrical energy.

The current flowing via the voltage link circuit is the current which flows across the voltage link circuit to the unfolding bridge in the inverter with reactive power capability. This current comprises components which flow into and out of the link circuit capacitance of the voltage link circuit. The link circuit capacitance is provided by one or a plurality of parallel- or series-connected link circuit capacitor(s).

By disconnecting the AC output from the voltage link circuit and providing the freewheeling path between the terminals of the AC output at least during this disconnection, the AC current at the AC output may flow further via the freewheeling path, wherein it is maintained by inductances which are present on the output side and through which current flows. The AC current is therefore not impaired by the measures which have to be taken, in particular in the case of AC current lagging behind the AC voltage at the AC output, for reversing the direction of the current flowing via the voltage link circuit when the polarity of the AC output relative to the voltage link circuit is changed by the unfolding bridge between the half-cycles of the AC voltage. These measures thus do not have the effect of an increased total harmonic distortion of the AC current.

In order to disconnect the AC output from the voltage link circuit, in principle a single-pole disconnection is sufficient because this already prevents a current flow from the voltage link circuit to the AC output, and vice versa.

If the AC output has more than two terminals, the indication that the freewheeling path is provided between the terminals of the AC output means that the freewheeling path is provided at least between two of the terminals.

The freewheeling path for the AC current may be provided by a capacitance between the terminals of the AC output, i.e. the freewheeling path does not have to galvanically connect the terminals of the AC output to one another. A capacitance suitable for the freewheeling path between the terminals of the AC output may be provided by a filter capacitor already present or an additional capacitor between the terminals of the AC output.

However, the freewheeling path may also be provided by short-circuiting the terminals of the AC output, i.e. by the terminals being directly connected to one another. Hard short-circuiting of the terminals of the AC output is also noncritical in view of the only low voltage at this time at the AC output.

Disconnecting the AC output from the voltage link circuit and providing the freewheeling path for the AC current may optionally also be performed upon reversing the direction of the current flowing via the voltage link circuit in the case of AC current leading the AC voltage at the AC output. They are advantageously performed at least if the AC current lags behind the AC voltage at the AC output, i.e. in the case of a negative phase shift angle between AC current and AC voltage at the AC output.

In the method according to the disclosure, it is advantageous to measure voltage and/or current at the AC output in order to determine suitable points in time for—according to the disclosure—disconnecting the AC output from the voltage link circuit and for reconnecting the AC output to the voltage link circuit.

In the method according to the disclosure, a bridge circuit may be used as the unfolding bridge, which bridge circuit changes the polarity of the AC output relative to the voltage link circuit substantially between the half-cycles of the AC voltage, i.e. at the zero crossing thereof. However, this does not exclude the case in which the bridge circuit performs other functions as well in the meantime, for which purpose its bridge switches may for example also be temporarily subjected to high-frequency clocking.

Preferably, a switchover bridge is used as the unfolding bridge in the method according to the disclosure. In this case, disconnecting the AC output from the voltage link circuit is preferably performed by opening bridge switches of the unfolding bridge. Likewise, the terminals of the AC output are short-circuited upon reversing the direction of the current via the voltage link circuit, preferably via bridge switches of the unfolding bridge.

Specifically, in the case of two terminals of the AC output and accordingly a total of four bridge switches of the unfolding bridge for disconnecting the AC output from the voltage link circuit and for short-circuiting the terminals of the AC output, two bridge switches of the unfolding bridge which are connected to the same pole of the voltage link circuit may be opened while the other two bridge switches of the unfolding bridge are closed. In this case, bridge switches of the unfolding bridge that have already been opened or closed previously may remain opened or closed. For subsequently reconnecting the AC output to the voltage link circuit with the polarity of the AC output relative to the voltage link circuit being changed by the unfolding bridge, it suffices to close one of the previously opened bridge switches and to open one of the previously closed bridge switches of the unfolding bridge.

In one specific embodiment, the method according to the disclosure relates to the operation of an inverter with reactive power capability comprising a bidirectional DC/DC converter having at least one storage inductor device, the voltage link circuit and the unfolding bridge. In this case, one terminal of the storage inductor device is connectable to one pole of a DC input via a switch. Another terminal of the storage inductor device is connected to one pole of the voltage link circuit; and the one terminal of the storage inductor device, or a further terminal of the storage inductor device connected to the same winding of the storage inductor device as the other terminal, is connectable to the other pole of the voltage link circuit via a switching element.

The fact that the terminal of the storage inductor device is connectable via a switch to one pole of a DC input does not necessarily require that a galvanic connection between the terminal of the storage inductor device and one pole of the DC input is producible. For example, in the case of a single-ended forward converter comprising a storage inductor on the opposite side of the transformer relative to the switch, the required temporary connection between the terminal of the storage inductor and the pole of the DC input is produced by closing the switch across the galvanically isolating transformer.

In the same way, the fact that the other terminal of the storage inductor device is connected to the pole of the voltage link circuit also does not necessarily require a galvanic connection. For example, in the case of a single-ended forward converter comprising a storage inductor on the same side of the transformer as the switch, the required connection between the pole of the storage inductor and the pole of the voltage link circuit is provided across the galvanically isolating transformer.

The above definition of the inverter with reactive power capability in the specific embodiment of the method according to the disclosure applies to many inverters in which the bidirectional DC/DC converter is implemented as a combination of a buck converter with a boost converter or as a buck-boost converter. In this case, a symmetrical design comprising two storage inductor devices may also be realized. In the case of a combination of a buck converter with the boost converter, the storage inductor devices may be used jointly by both converters. However, the boost converter and the buck converter may also comprise separate storage inductor devices. Specifically, the topology of the inverter may be designed in principle in exactly the same way as in the documents that were acknowledged as prior art for inverters with reactive power capability comprising a bidirectional DC/DC converter and an unfolding bridge in the above section "Prior art". Further variations of the topology of the inverter are possible.

In the specific embodiment of the method according to the disclosure, reversing the direction of the current flowing via the voltage link circuit in the case of AC current lagging behind the AC voltage at the AC output additionally comprises
charging the voltage link circuit with the current flowing through the storage inductor device, and
discharging the voltage link circuit via the storage inductor device or via a further storage inductor device.

If, in the specific embodiment of the method according to the disclosure, upon reversing the direction of the current flowing via the voltage link circuit, the temporary disconnection of the AC output from the voltage link circuit and/or the provision of a freewheel between the terminals of the AC output are/is dispensed with, the output AC current experiences a temporary decrease. This decrease may be smoothed by a suitably dimensioned AC filter and/or by adaptively connectable damping elements in the AC output.

Specifically, reversing the direction of the current flowing via the voltage link circuit in the case of AC current lagging behind the AC voltage at the AC output may proceed as follows: firstly, the voltage link circuit is disconnected from the AC output. Then, the switch which connects one end of the storage inductor device to the DC input is opened. When the current flowing through the storage inductor device then commutates to the switching element, which may comprise commutation to a diode or closing of a switch of the switching element, the current flowing through the storage inductor device charges the voltage link circuit. As a result, a back-EMF with respect to the current builds up until the current decays. Subsequently, the voltage link circuit is then discharged either via the same storage inductor device, but with the current that flows during discharge having the opposite direction to that during charging of the voltage link circuit, or via a further storage inductor device. At the instant at which the voltage link circuit is discharged via the respective storage inductor device, through the latter there flows a current having not only, as desired, the opposite direction to the original current but also the same current intensity. However, in the case of a further storage inductor device, this last presupposes that the further storage inductor device has an inductance of equal magnitude to that of the other storage inductor device. Moreover, the same current intensity is also achieved with inductances of the same magnitude only if losses are not taken into consideration, but such losses are generally very small and are therefore negligible.

When the current flows through the respective storage inductor device with the opposite direction and with the same or approximately the same current intensity, the voltage link circuit may be reconnected to the AC output. It goes without saying that this connection is performed with the polarity of the AC output relative to the voltage link circuit being changed by the unfolding bridge. After this reconnection of the voltage link circuit to the AC output, the DC/DC converter may be operated directly such that the current built up by the discharge of the voltage link circuit through the storage inductor device or the further storage inductor device continues to flow and is matched to the then applicable set point current value of the output AC current.

In this case, the steps of disconnecting the AC output from the voltage link circuit, charging the voltage link circuit, discharging the voltage link circuit and reconnecting the AC output to the voltage link circuit are performed at least approximately in the order in which they are listed here. In this regard, the voltage link circuit is at least substantially charged when it is disconnected from the AC output even if the charging may already commence before the disconnecting. Likewise, the discharging of the voltage link circuit, at least if it is performed via a further storage inductor device, may already commence before the end of charging or even be performed at the same time as charging. Furthermore, the voltage link circuit need not be completely discharged when it is reconnected to the AC output.

The reversal according to the disclosure of the direction of the current flowing via the voltage link circuit in the case of a negative phase shift angle between AC current and AC voltage is performed very rapidly. Specifically, it $\pi\sqrt{LC}$, wherein L is the inductance of the storage inductor device and C is the capacitance of the voltage link circuit. That is to say that the reversal of the direction of the current lasts half a resonance period of a resonant circuit formed from the storage inductor device and the voltage link circuit. In this case, it is also unimportant whether the voltage link circuit is discharged via the storage inductor device or a further storage inductor device. If the further storage inductor device has the same inductance, even exactly the same duration of the reversal of the direction of the current results. In any case, the reversal of the direction of the current lasts for much less time than if it were necessary to wait for a sufficient voltage-time integral of the AC voltage at the AC output for this purpose.

With the method according to the disclosure it is possible to achieve a profile which is very close to a sinusoidal set point value profile for the output AC current even in the case of a negative phase shift angle of the AC current relative to the AC voltage, and accordingly to achieve a very low total harmonic distortion.

If the switching element via which one end of the storage inductor device is connectable to the other pole of the voltage link circuit is a further switch, the latter is closed for charging and discharging the voltage link circuit for a total of half a resonance period of the resonant circuit formed by the storage inductor device and the voltage link circuit. However, the switching element may also be a diode to which the current through the storage inductor device commutates without active intervention when the switch which connects one end of the storage inductor device to one pole of the DC input is opened. It is then necessary to provide a further switch, which is closed for discharging the voltage link circuit via the storage inductor device. This closing is then performed over a quarter of a resonance period of the resonant circuit formed by the storage inductor device or the further storage inductor device and the capacitance of the voltage link circuit.

The inductance of the inductor device and the capacitance of the voltage link circuit should be coordinated with one another such that, during the resonance oscillation of the resonant circuit formed by them, the voltage of an input voltage link circuit of the inverter is not exceeded by the voltage of the voltage link circuit. Undesired current flows via the bidirectional DC/DC converter, specifically through antiparallel diodes of switches of the DC/DC converter, may otherwise occur. For the coordination it suffices to choose the capacitance with a sufficient magnitude. Alternatively or additionally, for the method according to the disclosure it is possible to increase the voltage of the input voltage link circuit in a targeted manner in order to prevent the voltage from being exceeded by the maximum voltage of the voltage link circuit. The fact that the voltage of the voltage link circuit in the resonant circuit should be less than the input link circuit voltage arises from the fact that the point in time at which a switch which is closed for discharging the voltage link circuit via the storage inductor device cannot quite be determined exactly. Upon complying with this upper limit for the voltage of the voltage link circuit by means of corresponding dimensioning of the capacitance of the voltage link circuit, the switch may even be deliberately switched on in a delayed manner. Conversely, a switch used to bring about the resonant reversal of the current direction may be closed only until the voltage across the voltage link circuit attains the voltage across the input voltage link circuit. The rest of the resonance oscillation can then take place across an extended resonant circuit including the input voltage link circuit and across the antiparallel diodes already mentioned.

As has already been noted, the inductances of the storage inductor device and of the further storage inductor device, if present, are preferably equal in magnitude in order to reverse the direction of the current via the voltage link circuit by means of the steps according to the disclosure, but not to significantly change the current intensity of the current. In principle, the inductance of the further storage inductor device may also be somewhat lower than the inductance of the other storage inductor device in order to achieve a current intensity of equal magnitude for the current with the opposite direction despite unavoidably occurring small losses. However, the set point value of the current intensity of the current lagging behind the AC voltage decreases in the case of an AC current with a negative phase shift angle at the point in time at which the direction of the current is reversed, such that a somewhat lower current intensity when the current is reversed is not damaging. In any case, the inductances of the storage inductor device and of the further storage inductor device should be at least approximately equal in magnitude.

Specifically, the bidirectional DC/DC converter in the method according to the disclosure may be operated such that the current to the voltage link circuit always flows via the storage inductor device and the current from the voltage link circuit always flows via the further storage inductor device, that is to say that the storage inductor device is always used for positive current and the further storage inductor device is always used for negative current, in relation to the instantaneous voltage at the AC output. For this purpose, the storage inductor device may be an inductor of a buck converter, while the further storage inductor device is an inductor of a boost converter which is connected in the reverse direction from the voltage link circuit to the DC input.

In the present disclosure, the storage inductor device may also comprise a storage transformer of a flyback converter with a blocking direction from the voltage link circuit to the DC input. The further storage inductor device may then comprise in particular a further storage transformer of a further flyback converter with a blocking direction from the DC input to the voltage link circuit. In principle, however, in this case, too, the further storage inductor device may be an inductor of a boost converter oriented from the voltage link circuit to the DC input. In the case where the storage inductor device comprises a storage transformer of a flyback converter, it has coupled windings, wherein one terminal, which is connected to the DC input by the switch, is connected to one winding, while the other terminal, which is connected to one pole of the voltage link circuit, and the further terminal, which is connectable to the other pole of the voltage link circuit via the switching element, are connected to another winding. A corresponding situation prevails if the further storage inductor device comprises a further storage transformer of a further flyback converter.

Generally, the further storage inductor device may be connectable to a pole of the DC input or to a pole of a buffer store for electrical energy via an additional switch. With the use of a buffer store it is possible to avoid a situation in which a DC source connected to the DC input is charged and discharged on provision of reactive power by the inverter with rapid alternation at the frequency of the AC current.

In the case of an inverter with reactive power capability comprising a bidirectional DC/DC converter, a voltage link circuit, an unfolding bridge and an operation controller, wherein the unfolding bridge is connected between poles of the voltage link circuit and terminals of an AC output, the operation controller is designed such that it operates the inverter according to the method according to the disclosure.

In order to implement the present disclosure, in the case of many known inverter topologies it actually suffices to modify the operation controller. That is to say that the disclosure is implementable with little complexity. The advantages according to the disclosure may therefore be utilized with little capital expenditure.

Other inverter topologies may be supplemented with simple measures to form advantageous embodiments of an inverter according to the disclosure. They include a symmetrical buck converter known in principle from DE 10 2010 035 020 A1 and comprising two switches with antiparallel diodes, arranged symmetrically with respect to a center line, two inductors arranged symmetrically with respect to the center line, and two diodes arranged symmetrically with respect to the center line, wherein the center line connects center points of an input voltage link circuit, center points between the diodes and center points of the voltage link circuit. It goes without saying that, in the case of these known symmetrical buck converters, the symmetry with respect to the center line does not relate to the forward directions of the diodes and the switches and thus also the antiparallel diodes thereof. Such a symmetrical buck converter may be supplemented by a switch which is connected in parallel with the diodes and without direct connection to the center line. The switch may on the one hand be closed in order to bring about the resonant current direction reversal of the current flowing via the voltage link circuit, and on the other hand be clocked in order to provide the known, in principle non-bidirectional symmetrical buck converter with a boost converter function in the opposite direction. In the boost converter function in the opposite direction, the additional switch is clocked as a boost converter switch, and the antiparallel diodes of the switches normally serving as buck converter switches act as boost converter diodes. No use is made here of the advantages of the symmetrically designed buck converter in the boost converter function. This is acceptable since the boost converter function is required only for a short period particularly in the case of small phase angles.

If a symmetrical buck converter known from DE 10 2010 035 020 A1 is supplemented by two switches each connected only in parallel with one of the two symmetrically arranged diodes, i.e. the two buck converter diodes, with in each case direct connection to the center line, these two supplemented switches may be closed according to different switching patterns in order to activate different resonant circuits. In this case, it proves to be advantageous if diodes are respectively connected in parallel with link circuit capacitors forming the two halves of the divided voltage link circuit, which diodes have the same forward directions as the buck converter diodes in relation to the poles of the voltage link circuit and prevent the link circuit capacitors from being charged oppositely to their customary polarity in operation of the inverter.

Possible embodiments of the bidirectional inverter according to the disclosure have already been explained in association with the method according to the disclosure. It should supplementarily be noted that the DC/DC converter and the unfolding bridge may, but need not, be arranged in a common inverter housing. By way of example, one or a plurality of DC/DC converters near the generator and a common polarity reverser, e.g. at a grid feed-in point, in separate housings are possible.

Advantageous developments of the disclosure are evident from the patent claims, the description and the drawings. The advantages of features and of combinations of a plurality of features as mentioned in the description are merely by way of example and may take effect alternatively or cumulatively, without the advantages necessarily having to be achieved by embodiments according to the disclosure. Without the subject matter of the appended patent claims being altered hereby, the following holds true with regard to the disclosure content of the original application documents and the patent: further features can be gathered from the drawings—in particular the relative arrangement and operative connection of a plurality of component parts with respect to one another. The combination of features of different embodiments of the disclosure or of features of different patent claims is likewise possible deviating from the chosen dependency references in the patent claims and is suggested hereby. This also concerns such features which are illustrated in separate drawings or are mentioned in the description thereof. These features may also be combined with features of different patent claims. Likewise, features presented in the patent claims may be omitted for further embodiments of the disclosure.

The features mentioned in the patent claims and the description should be understood in respect of their number such that exactly this number or a greater number than the number mentioned is present without the need for explicit use of the adverb "at least". Therefore, if an element is discussed, for example, this should be understood to mean that exactly one element, two elements or more elements are present. These features may be supplemented by other features or may be the only features of which the respective product consists.

The reference signs contained in the patent claims do not constitute any restriction of the scope of the subjects protected by the patent claims. They merely serve the purpose of making the patent claims more easily understandable.

BRIEF DESCRIPTION OF THE FIGURES

The disclosure is explained and described in greater detail below on the basis of exemplary embodiments with reference to the accompanying figures.

DESCRIPTION OF THE FIGURES

Figure 1:
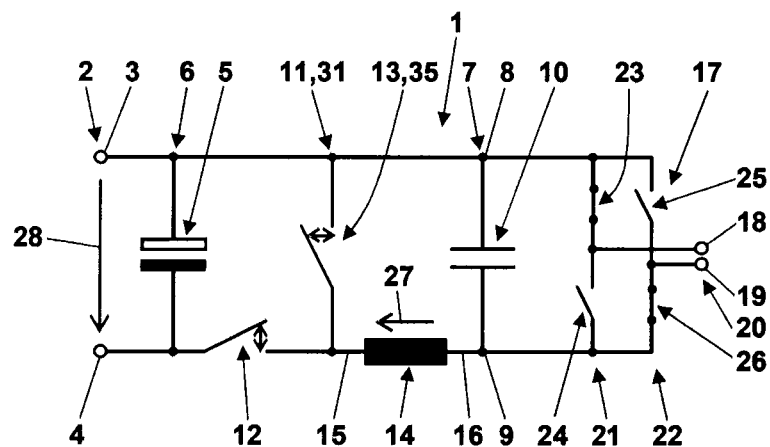
FIG. 1 shows an inverter comprising a buck-boost converter, a voltage link circuit and an unfolding bridge, wherein switching states of the switches of the buck-boost converter and of the bridge switches of the unfolding bridge shortly before the end of a half-cycle of the AC voltage in the case of AC current lagging behind the AC voltage are indicated.

The inverter 1 illustrated in FIG. 1 comprises a buck-boost converter 11 between a DC input 2 having two poles 3 and 4 and having an input voltage link circuit 6 comprising a link circuit capacitor 5 and a subsequent voltage link circuit 7 having two poles 8 and 9 and a link circuit capacitor 10. The buck-boost converter 11 comprises a switch 12, a further switch 13 and a storage inductor device 14 in the form of a simple inductor in a conventional arrangement for a buck-boost converter. That is to say that one terminal 15 of the storage inductor device 14 is connectable to one pole 4 of the DC input 2 via the switch 12. Another terminal 16 of the storage inductor device 14, which is connected to the same winding as the terminal 15, is connected to one pole 9 of the voltage link circuit 7; and the one terminal 15 of the storage inductor device 14 is connectable to the other pole 8 of the voltage link circuit 7 via the further switch 13.

By clocked driving of the switches 12 and 13 in a manner coordinated with one another, a current flowing via the voltage link circuit 7 to an unfolding bridge 17 may be shaped. In particular, an AC current may be shaped half-cycle by half-cycle, and two terminals 18 and 19 of an AC output 20 with a polarity that alternates half-cycle by half-cycle are connected to the poles 8 and 9 by the unfolding bridge. The unfolding bridge 17 comprises two half-bridges 21 and 22 comprising in each case two bridge switches 23 and 24, and 25 and 26, respectively. During a half-cycle of an AC voltage present at the AC output 20, the bridge switches 23 and 26 of the unfolding bridge are closed, as illustrated, and the bridge switches 24 and 25 arranged crosswise are then closed during the next half-cycle, in which case the other two bridge switches 23 and 26 are then open. If the AC output in this way at the AC output 20 is in phase with the AC voltage, i.e. the AC current neither leads nor lags behind the AC voltage and accordingly no phase shift angle deviating from zero is present, the current flows through the coil 14 and via the voltage link circuit 7 to the unfolding bridge 17 during each entire half-cycle of the AC voltage in the direction indicated by an arrow 27 in FIG. 1.

However, if the AC current leads or lags behind the AC voltage, i.e. there is a phase shift between AC current and AC voltage, the direction of the current via the voltage link circuit 7 changes once during each half-cycle of the AC voltage and additionally at the transition between the half-cycles. This last is necessary in order that the current maintains its direction at the AC output 20 upon polarity reversal of the unfolding bridge 17.

Figure 6:
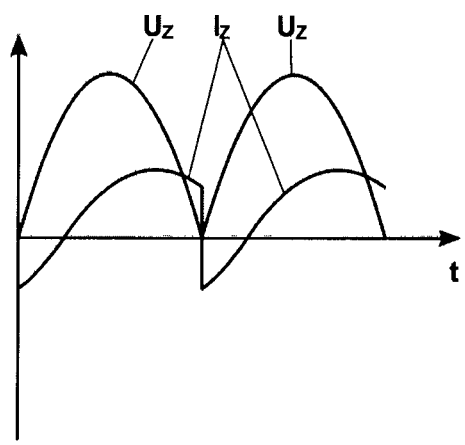
FIG. 6 shows the temporal profile of a link circuit voltage at the voltage link circuit and of a current flowing via the voltage link circuit over a period of the AC output by one of the inverters in accordance with FIGS. 1 to 5.
Figure 7:
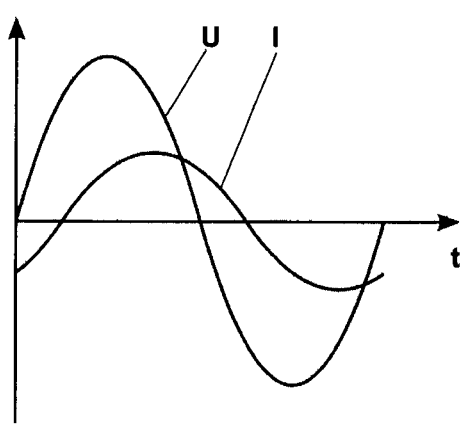
FIG. 7 shows an AC current which lags behind the AC voltage at the AC output of the respective inverter in accordance with FIGS. 1 to 5 and which is shaped by the unfolding bridge of the respective inverter from the current in accordance with FIG. 6.

The change in the current $I_Z$ flowing via the voltage link circuit 7 and the associated profile of the voltage $U_Z$ at the voltage link circuit 7 are illustrated in FIG. 6 for the case where the AC current I output by the inverter 1 lags behind the AC voltage U at the AC output 20. The profile of the AC current I and that of the AC voltage U are illustrated in FIG. 7. At the zero crossings of the AC voltage U in accordance with FIG. 7, the unfolding bridge 17 reverses the polarity of the terminals 18 and 19 relative to the poles 8 and 9 of the voltage link circuit 7. In order that the AC current I may maintain the sinusoidal profile in accordance with FIG. 7, the current $I_Z$ in accordance with FIG. 6 has to change its mathematical sign at the zero crossing of the voltage $U_Z$, and this with an increasing phase shift angle between the AC current I and the AC voltage U as the current intensity increases.

The reversal of the direction of the current during the respective half-cycle of the AC voltage is noncritical independently of the mathematical sign of the phase shift angle between AC current and AC voltage because the reversal of the direction takes place with a current intensity of zero, i.e. in the case of a continuous zero crossing. The reversal of the direction is also not difficult if, in the case of an AC current leading the AC voltage, a current that is already negative at the end of each half-cycle has to be changed into a positive current in the direction of the arrow 27 in accordance with FIG. 1 because a DC input voltage 28 present between the poles 3 and 4 of the DC input 2 may be used as a driving force for this purpose. The situation is different if, in the case of a current lagging behind the AC voltage, i.e. in the case of a negative phase shift angle as in FIGS. 6 and 7, the positive direction of the current indicated by the arrow 27 in FIG. 1 has to be reversed. There is no sufficient driving force available for this purpose at the zero crossing of the AC voltage at the AC output 20. To put it another way, in the case of a low instantaneous voltage at the DC output 20, a voltage-time integral required for reversing the direction of the current through the storage inductor device 14 is achieved only after a long time. However, this time may be shortened by the procedure described below.

Figure 2:
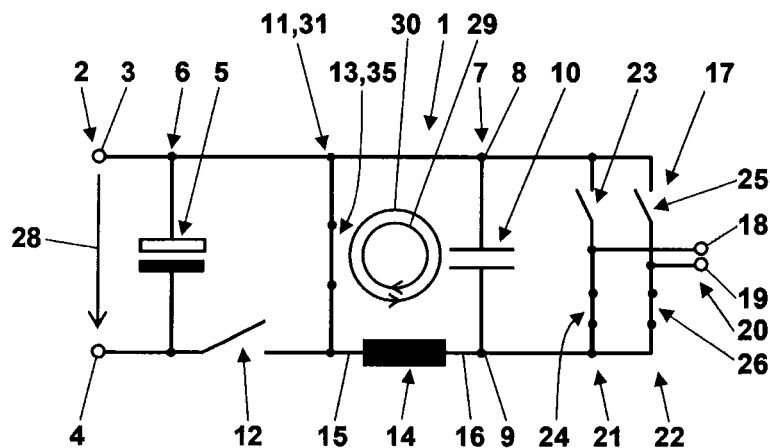
FIG. 2 shows the inverter in accordance with FIG. 1 with indicated switching states upon the transition to the next half-cycle of the AC voltage.

FIG. 2 illustrates a switching state of the switches 12 and 13 and of the bridge switches 23 to 26 for reversing the direction of a positive current through the storage inductor device 14 within a short time into a negative current with the opposite direction, but with the same current intensity. For this purpose, the voltage link circuit 7 is disconnected from the AC output 20 by opening of the switch 23. Instead, the switch 24 is closed in order to short-circuit the two terminals 18 and 19 of the AC output 20 via the bridge switches 24 and 26. Alternatively, in contrast to the switching position in accordance with FIG. 1, the switch 26 could also be opened and the switch 25 closed in order to achieve the same effects of disconnecting the voltage link circuit 7 from the AC output 20 and short-circuiting the terminals 18 and 19. The short-circuiting of the terminals 18 and 19 provides a freewheeling path for the AC current between the terminals 18 and 19, via which path the AC current can continue to flow between the terminals 18 and 19 when the voltage then present is low. Furthermore the switch 12 is opened and the switch 13 is closed. As a result, the current through the storage inductor device 14 commutates to the switch 13 and, in the case of current flow in the direction of the rotational arrow 29, charges the voltage link circuit 7, i.e. the link circuit capacitor 10 thereof. As a result, the link circuit voltage across the link circuit capacitor 10 increases until the current returns to zero and the voltage link circuit 7 is then discharged again through the storage inductor device 14 in the opposite direction indicated by a rotational arrow 30. When this discharge has concluded, the current flows as desired with the opposite direction but with the same current intensity as before through the storage inductor device 14. The procedure outlined here lasts half a resonance period of the resonant circuit formed by the storage inductor device 14 and the voltage link circuit 7, i.e. $\pi\sqrt{LC}$, wherein L is the inductance of the storage inductor device 14 and C is the capacitance of the link circuit capacitor 10. The AC current that continues to flow in the meantime via the freewheeling path between the terminals 18 and 19 additionally remains unaffected by the procedure described here.

Figure 3:
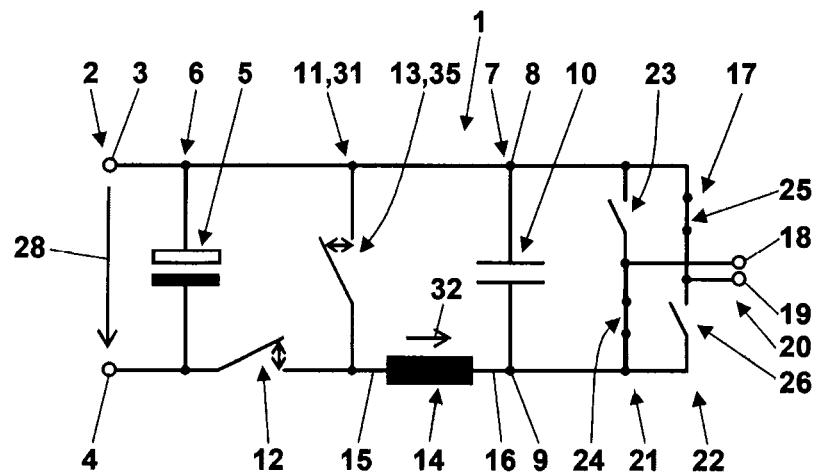
FIG. 3 shows the inverter in accordance with FIGS. 1 and 2 with indicated switching positions at the beginning of the next half-cycle of the AC voltage.

After this period of time, the operation of the inverter is begun as indicated in FIG. 3. The bridge switch 25 is closed, and the bridge switch 26 of the unfolding bridge 17 is opened in order to connect the AC output 20 to the voltage link circuit 7 with opposite polarity relative to FIG. 1. While in FIG. 1 the terminal 18 was connected to the pole 8 and the terminal 19 was connected to the pole 9, in accordance with FIG. 3 the terminal 18 is connected to the pole 9 and the terminal 19 is connected to the pole 8. The switches 12 and 13 are again subjected to high-frequency clocking in a manner coordinated with one another, this time in order to allow the current generated in accordance with FIG. 2 to continue to flow by stepping up the voltage between the voltage link circuit 7 and the input voltage link circuit 6 in the direction indicated by an arrow 32 through the storage inductor device 14, or to match the current to the presently applicable set point current value.

Figure 4:
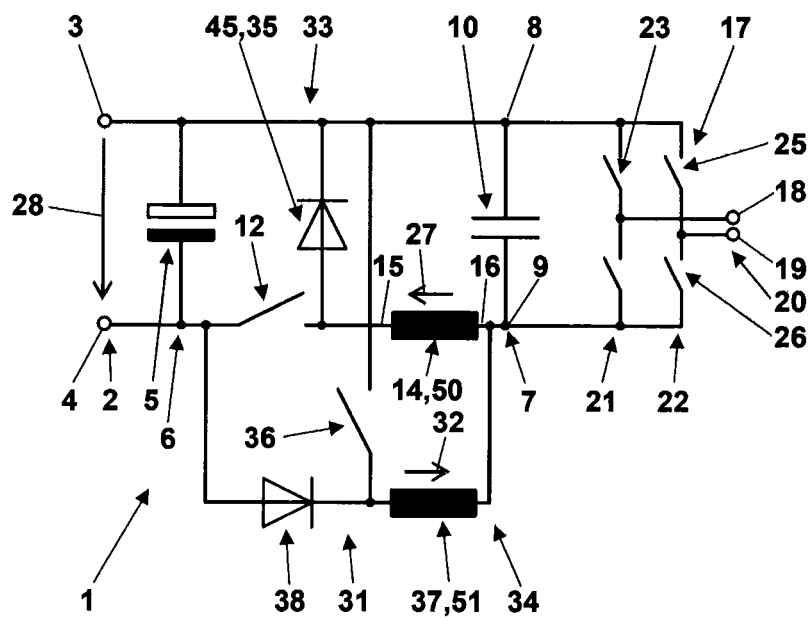
FIG. 4 shows an inverter in which, instead of a buck-boost converter, a combination of a buck converter and a boost converter oriented in the opposite direction is provided as a bidirectional DC/DC converter and which otherwise comprises a voltage link circuit and an unfolding bridge like the inverter in accordance with FIGS. 1 and 2.

While in the embodiment of the inverter 1 in accordance with FIGS. 1 to 3 the buck-boost converter 11 forms a bidirectional DC/DC converter 31 between the DC input 2 and the voltage link circuit 7, in the embodiment of the inverter 1 in accordance with FIG. 4 such a bidirectional DC/DC converter 31 is formed by the combination of a buck converter 33 with the storage inductor device 14 in the form of an inductor 50 and a boost converter 34 with a further storage inductor device 37 in the form of a further inductor 51, wherein the buck converter 33 is oriented from the DC input 2 to the voltage link circuit 7, while the boost converter 34 is oriented in the opposite direction from the voltage link circuit 7 to the DC input 2. The buck converter 33 corresponds to the buck-boost converter 11 in accordance with FIGS. 1 to 3 apart from the fact that a diode 45 is provided as switching element 35, via which the terminal 15 of the storage inductor device 14 is connectable to the pole 8 of the voltage link circuit 7. Thus, on opening of the switch 12, the current through the inductor 50 commutates in the direction of the arrow 27 to the diode 45 without the actuation of a switch being necessary for this purpose. However, in order to discharge the link circuit capacitor 10 of the voltage link circuit 7 again after it has been charged, a further switch 36 has to be closed. This further switch 36 is arranged here such that, when it closes, the voltage link circuit 7 flows in the opposite direction of the arrow 32 via the further inductor 51, which together with the switch 36 and a further diode 38 forms the boost converter 34. The negative current from the voltage link circuit 7 for the DC input 2 is therefore carried by the boost converter 34, while the positive current is carried by the buck converter 33. The still relatively high current in the direction of the arrow 27 through the inductor 50 at the end of the respective half-cycle of the AC voltage and thus at the end of the operation of the buck converter 33 is used here with buffer storage of the electrical energy in the voltage link circuit 7 in order to precharge the further inductor 51 of the boost converter 34 with the current in the opposite direction in accordance with the arrow 32 for operation thereof at the beginning of the next half-cycle of the AC voltage.

Figure 5:
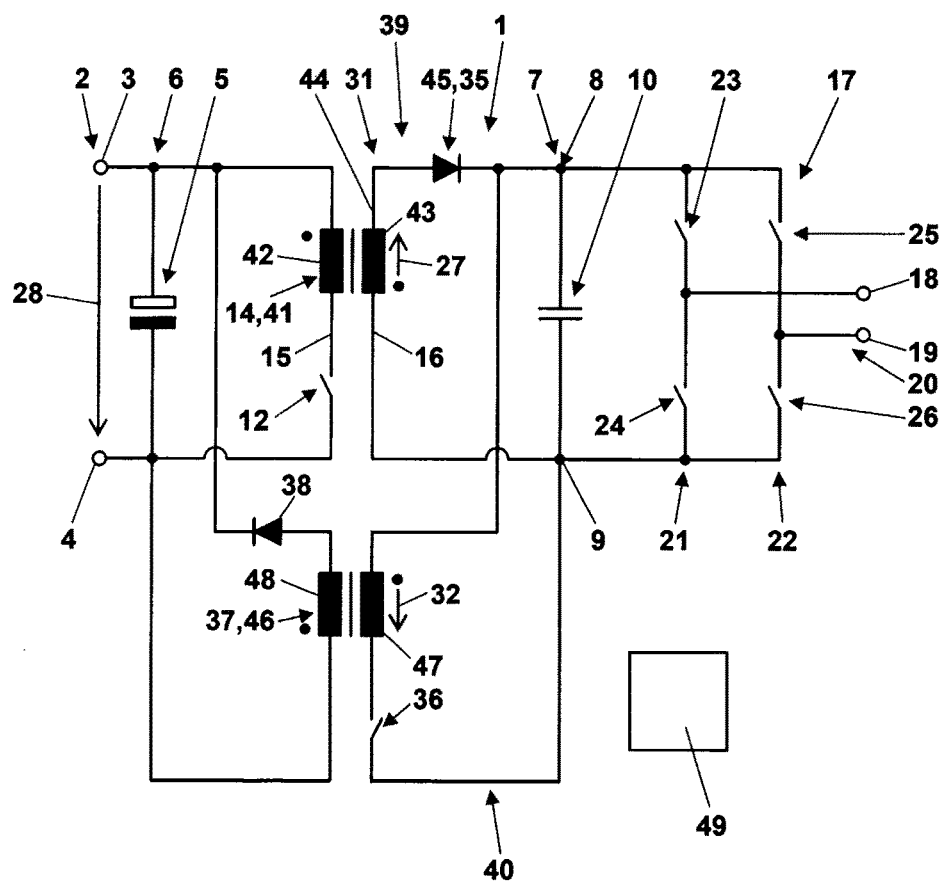
FIG. 5 shows an inverter in which the bidirectional DC/DC converter is formed from two flyback converters having opposite blocking directions and which apart from that comprises a voltage link circuit and an unfolding bridge like the inverters in accordance with FIGS. 1 to 4.

FIG. 5 shows an embodiment of the inverter 1 in which the bidirectional DC/DC converter 31 between the DC input 2 and the voltage link circuit 7 is formed by two flyback converters 39 and 40 with mutually opposite reverse directions. In this case, the storage inductor device 14 comprises a storage transformer 41 of the flyback converter 39 with two magnetically coupled windings 42 and 43. The terminal 15 of the storage inductor device 14 which is connectable to the pole 4 of the DC input 2 via the switch 12 is connected to the winding 42. The terminal 16 of the storage inductor device 14 which is connected to the pole 9 of the voltage link circuit 7 is connected to the winding 43. Furthermore, a terminal 44 which is connectable to the pole 8 of the voltage link circuit 7 via the switching element 35, here as well in the form of a diode 45, is connected to the second winding 43. Correspondingly, the further storage inductor device 37 comprises a storage transformer 46 of the further flyback converter 40 and has two windings 47 and 48. In this case, the further switch 36 is connected to the winding 47 and the further diode 38 is connected to the winding 48. Upon transition between two half-cycles of the AC voltage at the AC output 20, the voltage link circuit 7 is charged by opening of the switch 12 and corresponding current flow through the winding 43 in the direction of the arrow 27, the voltage link circuit then being discharged by closing of the switch 36 in order to bring about a current of the same current intensity in the direction of the arrow 32 through the winding 47 of the further storage inductor device 37. As a result, the further flyback converter 40 may commence its operation at the start of the next half-cycle of the AC voltage immediately with this current through the winding 47 and thus beginning from the voltage link circuit 7 to the DC input 2 after the unfolding bridge 17 has changed the polarity of the AC output 20 relative to the voltage link circuit 7. During the course of this half-cycle, upon the next zero crossing of the current, the current flow then changes from the flyback converter 40 back to the flyback converter 39. However, this takes place at a current intensity of zero and is therefore unproblematic.

Furthermore, FIG. 5 shows an operation controller 49, which controls the operation of the inverter and thus in particular the opening and closing of the switches 12 and 36 and of the bridge switches 23 to 26.

Figure 8:
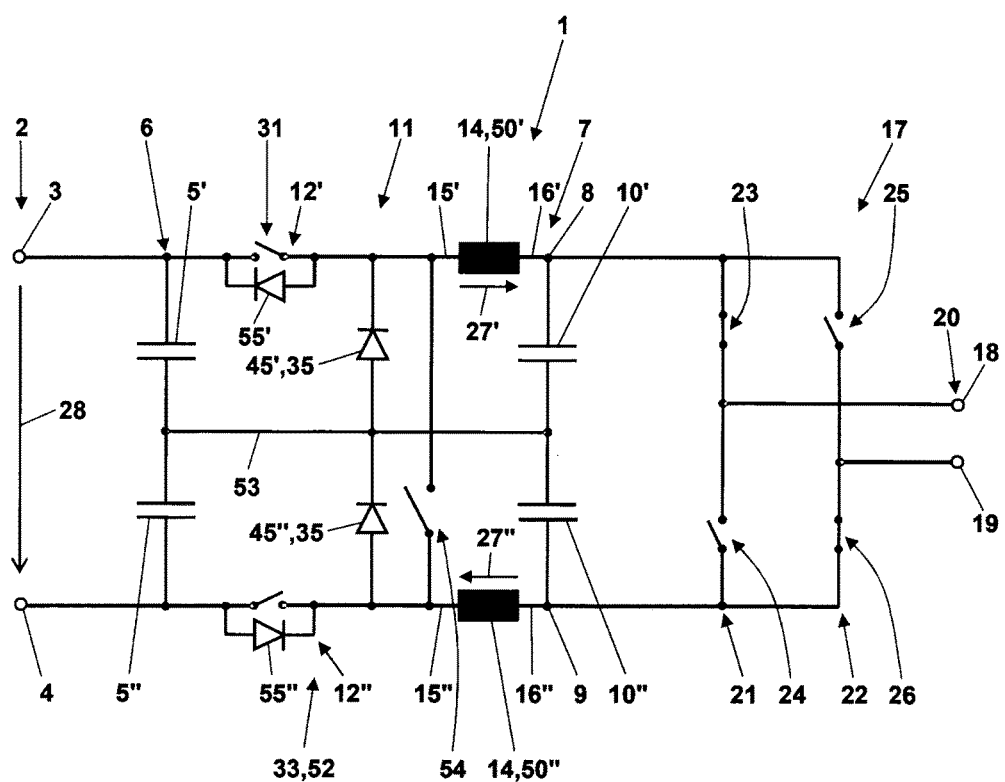
FIG. 8 shows an inverter in which the bidirectional DC/DC converter is formed from a symmetrical buck converter with an additional switch.

FIG. 8 illustrates a symmetrical buck converter 52 with an additional switch 54 as an exemplary embodiment of a bidirectional DC/DC converter 31 of the inverter 1. The symmetrical buck converter is implemented symmetrically with respect to a center line 53. The center line 53 connects a center point of the input link circuit 6, which here comprises two link circuit capacitors 5' and 5" preferably having the same capacitance, and a center point of the voltage link circuit 9, which here likewise comprises two link circuit capacitors 10' and 10". In this case, two switches 12' and 12", two inductors 50', 50" and two diodes 45', 45" are arranged symmetrically with respect to the center line 53 apart from the forward directions of the diodes 45' and 45" and forward directions of the switches 12' and 12" and of antiparallel diodes 55' and 55" of the switches 12' and 12", wherein the center point between the diodes 45' and 45" is connected to the center line 53. An inverter 1 comprising such a symmetrical buck converter and polarity reverser 17 on the output side is known for example from DE 10 2010 035 020 A1. However, contrary to the statements in DE 10 2010 035 020 A1, the known inverter has reactive power capability only to a very limited extent. In the case of the inverter 1 in accordance with FIG. 8, by contrast, unlimited reactive power capability is achieved by means of the additional switch 54. It may be used as a boost converter switch, in which case the antiparallel diodes 55' and 55" of the opened switches 12' and 12" then act as boost converter diodes. In addition, the switch 54 may be used to bring about the reversal of the direction of the current through the inductors 50' and 50" in accordance with the arrows 27' and 27" according to the disclosure by virtue of the switch 54 being closed for half a resonance period. In this case, a single resonant circuit is formed by means of the inductors 50' and 50" and the link circuit capacitors 10' and 10". The supplementation of the one switch 54 therefore makes it possible, in the case of a fundamentally known inverter, to provide reactive power capability with low total harmonic distortion.

The invention claimed is:

1. A method for operating an inverter with reactive power capability that comprises a voltage link circuit and an unfolding bridge, wherein poles of the voltage link circuit are configured to be selectively connected to terminals of an AC output in different configurations by means of the unfolding bridge, in order to change a polarity of the AC output relative to the voltage link circuit, the method comprising:
in the case of a phase shift between an AC current (I) and an AC voltage (U) at the AC output, reversing the direction of a current flowing via the voltage link circuit, wherein reversing the direction of the current flowing via the voltage link circuit comprises:
disconnecting the AC output from the voltage link circuit,
providing a freewheeling path between the terminals of the AC output, while the AC output is disconnected from the voltage link circuit, and
reconnecting the AC output to the voltage link circuit with the polarity of the AC output relative to the voltage link circuit being changed by the unfolding bridge.

2. The method as claimed in claim 1, wherein the AC output is disconnected from the voltage link circuit by bridge switches of the unfolding bridge being opened.

3. The method as claimed in claim 1, further comprising short-circuiting the terminals of the AC output when providing the freewheeling path.

4. The method as claimed in claim 3, wherein the terminals of the AC output are short-circuited via bridge switches of the unfolding bridge.

5. The method as claimed in claim 4, wherein the AC output is disconnected from the voltage link circuit by bridge switches of the unfolding bridge being opened, and wherein the voltage link circuit comprises two poles, and wherein for disconnecting the AC output from the voltage link circuit and for short-circuiting the terminals of the AC output bridge switches of the unfolding bridge that are connected to the same pole of the voltage link circuit are opened, and the other bridge switches of the unfolding bridge are closed.

6. The method as claimed in claim 1, wherein in the case of the phase shift the AC current (I) lags behind the AC voltage (U) at the AC output.

7. The method as claimed in claim 1, wherein the current via the voltage link circuit is shaped by a bidirectional DC/DC converter.

8. The method as claimed in claim 7, wherein the bidirectional DC/DC converter comprises at least one storage inductor device, wherein one terminal of the storage inductor device is connectable to one pole of a DC input via a switch, another terminal of the storage inductor device is connected to one pole of the voltage link circuit, and the one terminal of the storage inductor device, or a further terminal of the storage inductor device connected to the same winding of the storage inductor device as the other terminal, is configured to be connected to the other pole of the voltage link circuit via a switching element, wherein reversing the direction of the current flowing via the voltage link circuit in the case of the AC current (I) lagging behind the AC voltage (U) at the AC output furthermore comprises:
charging the voltage link circuit with current flowing through the storage inductor device, and discharging the voltage link circuit via the storage inductor device or via a further storage inductor device.

9. The method as claimed in claim 8, wherein the switch connecting the one terminal of the storage inductor device to the DC input is opened in order to charge the voltage link circuit with the current flowing through the storage inductor device and commutating to the switching element.

10. The method as claimed in claim 8, wherein after reconnecting the voltage link circuit to the AC output the DC/DC converter is operated such that a current generated by discharging the voltage link circuit through the storage inductor device or the further storage inductor device continues to flow.

11. The method as claimed in claim 8, wherein the switching element is a further switch being closed for charging and discharging the voltage link circuit over half a resonance period of a resonant circuit formed by the storage inductor device and the voltage link circuit.

12. The method as claimed in claim 8, wherein the switching element is a diode, and wherein a further switch is provided that is selectively closed for discharging the voltage link circuit via the storage inductor device or the further storage inductor device over a quarter of the resonance period of the resonant circuit formed by the storage inductor device or the further storage inductor device and the voltage link circuit.

13. A method for operating an inverter with reactive power capability comprising a bidirectional DC/DC converter, a voltage link circuit, and an unfolding bridge, wherein the bidirectional DC/DC converter comprises at least one storage inductor device, wherein one terminal of the storage inductor device is configured to be connected to one pole of a DC input via a switch, another terminal of the storage inductor device is connected to one pole of the voltage link circuit, and the one terminal of the storage inductor device, or a further terminal of the storage inductor device connected to the same winding of the storage inductor device as the other terminal, is configured to be connected to the other pole of the voltage link circuit via a switching element, wherein poles of the voltage link circuit are configured to be connected to terminals of an AC output in different configurations by means of the unfolding bridge, in order to change a polarity of the AC output relative to the voltage link circuit, and wherein the method comprises:

in the case of a phase shift between an AC current (I) and an AC voltage (U) at the AC output, reversing the direction of a current flowing via the voltage link circuit, when the polarity of the AC output relative to the voltage link circuit is changed by the unfolding bridge between the half-cycles of the AC voltage;

reversing the direction of the current flowing via the voltage link circuit in the case of the AC current (I) lagging behind the AC voltage (U) at the AC output, wherein the reversing comprises:

charging the voltage link circuit with the current flowing through the storage inductor device, and discharging the voltage link circuit via the storage inductor device or via a further storage inductor device.

14. The method as claimed in claim 13, wherein reversing the direction of the current flowing via the voltage link circuit in the case of the AC current (I) lagging behind the AC voltage (U) at the AC output furthermore comprises:

disconnecting the AC output from the voltage link circuit, providing a freewheeling path between terminals of the AC output, while the AC output is disconnected from the voltage link circuit, and reconnecting the AC output to the voltage link circuit with the polarity of the AC output relative to the voltage link circuit being changed by the unfolding bridge.

15. An inverter with reactive power capability, comprising:

a bidirectional DC/DC converter, a voltage link circuit coupled to the bidirectional DC/DC converter, an unfolding bridge, and an operation controller, wherein the unfolding bridge is connected between poles of the voltage link circuit and terminals of an AC output, and wherein the operation controller is operably coupled to the unfolding bridge and is configured to operate the inverter according to a method comprising:

in the case of a phase shift between an AC current (I) and an AC voltage (U) at the AC output, reversing the direction of a current flowing via the voltage link circuit, wherein reversing the direction of the current flowing via the voltage link circuit comprises:

disconnecting the AC output from the voltage link circuit, providing a freewheeling path between the terminals of the AC output, while the AC output is disconnected from the voltage link circuit, and reconnecting the AC output to the voltage link circuit with the polarity of the AC output relative to the voltage link circuit being changed by the unfolding bridge.

16. The inverter as claimed in claim 15, wherein the bidirectional DC/DC converter comprises at least one storage inductor device, wherein:

one terminal of the storage inductor device is configured to be connected to one pole of a DC input via a switch, another terminal of the storage inductor device is connected to one pole of the voltage link circuit, and the one terminal of the storage inductor device, or a further terminal of the storage inductor device connected to the same winding of the storage inductor device as the other terminal, is configured to be connected to the other pole of the voltage link circuit via a switching element.

17. The inverter as claimed in claim 16, wherein the storage inductor device comprises an inductor of a buck converter oriented from the DC input to the voltage link circuit.

18. The inverter as claimed in claim 17, further comprising a further storage inductor device comprising a further inductor of a boost converter oriented from the voltage link circuit to the DC input.

19. The inverter as claimed in claim 16, wherein the storage inductor device comprises a storage transformer of a flyback converter with a blocking direction from the voltage link circuit to the DC input and a further storage inductor device comprises a further storage transformer of a further flyback converter with a blocking direction from the DC input to the voltage link circuit.

20. The inverter as claimed in claim 18, wherein inductances (L) of the storage inductor device and of the further storage inductor device are equal in magnitude.

21. The inverter as claimed in claim 19, wherein inductances (L) of the storage inductor device and of the further storage inductor device are equal in magnitude.

22. The inverter as claimed in claim 18, wherein a terminal of the further storage inductor device is configured to be connected to a pole of the DC input or to a pole of a buffer for electrical energy via an additional switching element.

23. The inverter as claimed in claim 17, wherein the buck converter is a symmetrical buck converter comprising two switches with antiparallel diodes arranged symmetrically with respect to a center line, two inductors arranged symmetrically with respect to the center line, and two diodes arranged symmetrically with respect to the center line, wherein the center line connects center points of an input voltage link circuit, center points between the diodes and center points of the voltage link circuit, and wherein a switch is connected in parallel with the diodes and without direct connection to the center line.

* * * * *